United States Patent [19]

Wiggins

[11] Patent Number: 4,775,736

[45] Date of Patent: Oct. 4, 1988

[54] EPOXY CURING AGENT COMPOSITION

[75] Inventor: Paul L. Wiggins, Baton Rouge, La.

[73] Assignee: Ethyl Corporation, Richmond, Va.

[21] Appl. No.: 89,524

[22] Filed: Aug. 26, 1987

Related U.S. Application Data

[63] Continuation-in-part of Ser. No. 813,925, Dec. 27, 1985, abandoned.

[51] Int. Cl.[4] ............... C08G 59/68; C08G 65/10
[52] U.S. Cl. .................... 528/91; 528/120; 528/122; 525/99; 525/336; 525/341; 252/182.13
[58] Field of Search ............ 252/182; 528/91, 120, 528/122; 525/99, 336, 341

[56] References Cited

U.S. PATENT DOCUMENTS

| | | | |
|---|---|---|---|
| 3,655,461 | 4/1972 | Miwa | 148/23 |
| 4,436,880 | 3/1984 | Irving | 525/504 |
| 4,447,586 | 5/1984 | Shimp | 525/504 |
| 4,515,912 | 5/1985 | Sayles | 523/456 |

*Primary Examiner*—Kriellion Morgan
*Attorney, Agent, or Firm*—Patricia J. Hogan

[57] ABSTRACT

Epoxy resins having acceptable pot lives, degrees of reactivity, and physical properties are obtained by the use of curing agent compositions which comprise about 99.6–90% by weight of a hindered aromatic diamine, such as diethyltoluenediamine, and about 0.4–10% by weight of an accelerator complex of boron trifluoride and a cycloaliphatic diamine, such as isophoronediamine.

17 Claims, No Drawings

EPOXY CURING AGENT COMPOSITION

CROSS-REFERENCE TO RELATED APPLICATION

This application is a continuation-in-part of copending application Ser. No. 813,925, filed Dec. 27, 1985, now abandoned.

FIELD OF INVENTION

The invention relates to epoxy resins and more particularly to compositions suitable for preparing epoxy resins which have acceptable pot lives, degrees of reactivity, and physical properties.

BACKGROUND

It is known that aromatic diamines can be used to cure epoxy resins but that the practical utility of any aromatic diamine in this regard is dependent on factors such as its relative toxicity, its pot life in admixture with the epoxy resin, its reactivity, and the physical properties which it imparts to the cured resin. It is also known that the reactivity of an aromatic diamine curing agent can be increased by the use of an accelerator but that the presence of an accelerator in an epoxy resin-/aromatic diamine composition shortens its pot life, sometimes to the point where the composition is no longer suitable for use in various operations, such as filament winding.

Among the accelerators that have been used to speed the cure of epoxy resin with aromatic diamines are complexes of boron trifluoride with monoamines such as aniline and ethylamine. As mentioned in U.S. Pat. No. 4,447,586 (Shimp), these complexes have the disadvantage of tending to crystallize or precipitate out from solutions in hindered aromatic diamines on standing.

SUMMARY OF INVENTION

An object of this invention is to provide novel curing agent compositions.

Another object is to provide such compositions which are suitable for preparing epoxy resins having acceptable pot lives, degrees of reactivity, and physical properties.

A further object is to provide such compositions comprising a hindered aromatic diamine curing agent and an accelerator which is soluble therein and does not precipitate therefrom on standing.

These and other objects are attained by the provision of (1) compositions comprising about 99.6–90% by weight of a hindered aromatic diamine and about 0.4–10% by weight of an accelerator complex of boron trifluoride and a cycloaliphatic diamine and (2) mixtures of such compositions with epoxy resins.

DETAILED DESCRIPTION

Hindered aromatic diamines that can be used in the practice of the invention are aromatic diamines in which each position ortho to each amino group bears a hydrocarbyl or hydrocarbylthio substituent, usually an alkyl or alkylthio group containing 1–6, preferably 1–3, carbons. It is important that the aromatic diamine be hindered because the unhindered aromatic diamines are more toxic and give unacceptably short pot lives when used with epoxy resins and boron trifluoride/cycloaliphatic diamine complexes.

Exemplary of utilizable hindered aromatic diamines are 3,5-diethyl-2,4-diaminotoluene, 3,5-diethyl-2,6-diaminotoluene, 1,3,5-triethyl-2,4-diaminobenzene, 1-ethyl-3,5-diisopropyl-2,6-diaminobenzene, 1,3,4,6-tetramethyl-2,5-diaminobenzene, 1,4-dimethyl-3,6-diethyl-2,5-diaminobenzene, methylenebis-(2,6-diisopropylaniline), methylenebis(2,6-diethylaniline), methylenebis(2-methyl-6-ethylaniline), 2,4,6-tri(methylthio)-1,3-diaminobenzene, 3,5-di(methylthio)-2,4-diaminotoluene, 3,5-di(ethylthio)-2,4-diaminotoluene, 3-methylthio-5-ethylthio-2,4-diaminotoluene, 3,5-di(methylthio)-2,6-diaminotoluene, 4,4'-diamino-3,3',5,5'-tetra(methylthio)biphenyl, 4,4'-ethylidenebis[2,6-di(methylthio)aniline], 4,4'-methylenebis[2,6-di(ethylthio)aniline], etc., and mixtures thereof. The preferred hindered aromatic diamines are those which are liquids, especially diethyltoluenediamine—a mixture of 3,5-diethyl-2,4-diaminotoluene and 3,5-diethyl-2,6-diaminotoluene.

The accelerator is a complex of boron trifluoride and a cycloaliphatic diamine. The cycloaliphatic diamine moiety is preferably a diamine containing at least one cyclohexyl ring; but other cycloaliphatic diamines, such as substituted and unsubstituted cyclopentyl and cyclooctyl diamines, are also utilizable. Examples of useful cycloaliphatic diamines are 1,2-diaminocyclopentane, the 1,2- and 1,3-diaminocyclohexanes, the 2,4-, 2,5-, and 2,6-diamino-1-methylcyclohexanes, 1-amino-5-aminomethyl-3,3,5-trimethylcyclohexane(isophoronediamine), 1,8-diamino-p-menthane, bis(3-methyl-4-aminocyclohexyl)methane, bis(4-aminocyclohexyl)methane, etc. The preferred cycloaliphatic diamine is isophoronediamine.

The accelerator may be combined with the hindered aromatic diamine curing agent in any suitable manner to provide a mixture of about 0.4–10% by weight of the accelerator and about 99.6–90% by weight of the curing agent. When a preformed boron trifluoride/cycloaliphatic diamine complex is available, it may simply be stirred into the curing agent. When a preformed complex is not available, it is convenient to form the complex in situ by adding boron trifluoride gas to a stirred mixture of the curing agent and the appropriate cycloaliphatic diamine at a suitable temperature, e.g., about 20°–150° C., or by adding the boron trifluoride to the curing agent and then adding the cycloaliphatic diamine. The manner of combining the ingredients does not appear to be critical. However, when it is necessary to synthesize the accelerator, it is generally preferred to use the boron trifluoride (or a source thereof, such as boron trifluoride etherate) and the cycloaliphatic diamine in a mol ratio of about 0.5–1.5/1.

Epoxy resins which can be cured with the curing agent compositions of the invention are the monomeric and polymeric epoxy resins containing an average of more than one vicinal epoxy group per molecule, i.e., all of the materials known as epoxy resins. These resins may be saturated or unsaturated, aliphatic, cycloaliphatic, aromatic, or heterocyclic, as disclosed, e.g., in Lee et al., *Handbook of Epoxy Resins*, McGraw-Hill Book Company (New York), 1967, the teachings of which are incorporated herein in toto by reference. Such resins, of course, are well known and are most commonly reaction products of epichlorohydrin with hydroxyl compounds such as bisphenol A, tetrabromobisphenol A, resorcinol, novolacs, p-aminophenol, 1,1,2,2-tetra(p-hydroxyphenyl)ethane, tris(p-hydroxyphenyl)methane, 1,4-butanediol, glycerol, poly(oxypropylene)glycol, etc., or with polyamino compounds, such as methylenedianiline, etc. The preferred epoxy resins are those which are liquids. When the epoxy resin is to be used in a filament winding operation, as in a preferred embodiment of the invention, the preferred resins are diglycidyl ethers of bisphenol A.

In preparing the epoxy resin compositions of the invention, the epoxy resin and curing agent composition are generally combined so as to provide substantially equivalent amounts of the resin and curing agent, although smaller or larger amounts of either ingredient can be used if desired. Most commonly, the concentration of curing agent is in the range of about 0.5–1.5, preferably about 0.8–1.3, equivalents per equivalent of epoxy resin. The amount of accelerator is typically in the range of about 0.1–2.5, preferably about 0.5–1.0, parts per hundred parts by weight of epoxy resin.

These curable epoxy resin compositions are prepared by mixing the epoxy resin and curing agent compositions as liquids, the ingredients being heated when it is necessary to liquefy them. When desired, conventional additives such as pigments, dyes, fibers, other fillers, flame retardants, other resins, diluents, etc., may also be incorporated.

Curing of the epoxy resins is accomplished in the conventional manner by heating the epoxy resin/curing agent/accelerator compositions to a curing temperature, normally a temperature in the range of about 100°–250° C. This is typically done by heating the compositions to a temperature of about 90°–130° C. to bring them to a gel and then curing them at a higher temperature in the range of about 100°–250° C. Among the cure cycles that have been found particularly satisfactory are (1) heating from 50° C. to 175° C. at 5° C. per minute and then holding at 175° C. for 25 minutes, (2) heating at 115° C. for 10 minutes and at 163° C. for 12 minutes, and (3) heating at 100° C. for two hours and at 175° C. for four hours.

The epoxy resin/curing agent/accelerator compositions may be used in a broad variety of types of epoxy cures, including those for filament wound pipe, printed circuits, aircraft/aerospace, ordnance, automotive, sports/recreation applications, etc.

The invention is advantageous in that the solubility of the boron trifluoride/cycloaliphatic diamine complexes in hindered aromatic diamines to form stable solutions makes it possible to store the curing agent compositions. Moreover, the complexes do not appear to be adversely affected by water, and their mixtures with the curing agents and epoxy resins have acceptable pot lives (i.e., pot lives of at least two hours) and good reactivity, as well as the ability to form cured epoxy resins having good physical properties.

The following examples are given to illustrate the invention and are not intended as a limitation thereof.

EXAMPLE I

Accelerator Complex

A suitable reaction vessel containing 18.92 g (0.111 mol) of isophoronediamine (IPD) and 135 mL of methylene chloride was charged with 9.2 g (0.136 mol) of $BF_3$ over a period of 20 minutes, and an additional 4.2 g (0.025) of IPD was then added to provide an equimolar ratio of the reactants. The resulting solution was stirred well, and nitrogen was bubbled through it to remove most of the methylene chloride. The remaining methylene chloride (about 7.6 g) was driven off by heating and the reaction mass cooled to provide 32.5 g of solid $BF_3$/IPD complex.

EXAMPLE II

Curing Agent/Accelerator Composition

A suitable reaction vessel containing 1896.3 g of diethyltoluenediamine (DETDA) at 80° C. was charged with 278.2 g of $BF_3$ over a period of 4.5 hours, stirred for an additional 20 minutes, and allowed to stand overnight at room temperature. After the solution had been heated to 74° C. and stirred for one hour, the temperature was maintained at 74°–89° C. while adding 346.6 g of IPD over a period of 0.5 hour and an additional 352.1 g of IPD in the next 0.5 hour.

The resulting 2873.2 g of a solution of 34% by weight of a $BF_3$/IPD complex in 66% by weight of DETDA was divided into three portions—(1) a 7 g sample which was stored for three months, (2) a 1417.8 g portion which was diluted with additional DETDA and agitated to provide 18,047 g of a solution of 2.67% by weight of a $BF_3$/IPD complex in 97.33% by weight of DETDA, and (3) a 1448.4 g portion which was diluted with additional DETDA and agitated to provide 18,500 g of a solution of 2.66% by weight of a $BF_3$/IPD complex in 97.34% by weight of DETDA. Small samples were taken from each of the dilute solutions, blanketed with nitrogen, sealed, and—like the 7 g sample—stored for three months. Throughout and at the end of the storage period all three sample solutions remained clear without any precipitate.

EXAMPLE III

Epoxy/Curing Agent/Accelerator Composition

Each of ten curable compositions was prepared by mixing 100 parts of a liquid commercial diglycidyl ether of bisphenol A having an epoxide equivalent of 183 with a curing agent composition. The amounts of ingredients used to prepare each of the curing agent compositions and the cure characteristics of the epoxy compositions are shown in Table I.

TABLE I

| Sample | DETDA (phr) | $BF_3$ (phr) | IPD (phr) | Gel Time at 115° C. (min.) | Peak Temp. from DSC (°C.) | Tg-1* (°C.) | Tg-2** (°C.) |
| --- | --- | --- | --- | --- | --- | --- | --- |
| III-A | 25.5 | — | — | 61 | 197 | 172 | 129 |
| III-B | 23.5 | 0.18 | — | 17 | 156 | 170 | 176 |
| III-C | 25.5 | 1.90 | — | 2 | 120 | — | 167 |
| III-1 | 25.2 | 0.39 | 0.56 | 15 | 147 | 158 | 181 |
| III-2 | 25.4 | 0.27 | 0.56 | 17 | 148 | 159 | 178 |
| III-3 | 30.0 | 0.24 | 0.60 | 18 | 161 | 143 | 151 |
| III-4 | 25.5 | 0.20 | 0.42 | 24 | 157 | 165 | 172 |
| III-5 | 25.5 | 0.20 | 0.50 | 29 | 165 | 170 | 160 |
| III-6 | 22.9 | 0.18 | 0.45 | 35 | 168 | 171 | 147 |

TABLE I-continued

| Sample | DETDA (phr) | BF₃ (phr) | IPD (phr) | Gel Time at 115° C. (min.) | Peak Temp. from DSC (°C.) | Tg-1* (°C.) | Tg-2** (°C.) |
|---|---|---|---|---|---|---|---|
| III-7 | 21.4 | 0.17 | 0.42 | 38 | 170 | 181 | 134 |

*Tg-1 - Tg obtained on a sample which was heated from 30° C. to 300° C. at 10° C./min., cooled to 30° C., and reheated at 10° C./min.
**Tg-2 - Tg obtained on a sample which was heated from 50° C. to 175° C. at 5° C./min., held at 175° C. for 25 minutes, cooled to 30° C., and reheated at 10° C./min.

These data show that compositions having acceptable reactivities and glass transition temperatures can be obtained by the use of either boron trifluoride or a boron trifluoride/cycloaliphatic diamine complex as an accelerator. However, the compositions of the invention have the advantage of longer pot lives. For example, the Example III-B composition has a pot life of only about one hour—too short for an operation such as filament winding—while the Example III-3 composition, which has comparable reactivity, has a pot life of more than two hours. The present epoxy resin compositions also have an advantage over comparable compositions containing a boron trifluoride/ethylamine complex in that their glass transition temperatures are typically higher, thus making them more suitable for use in high temperature applications.

Table II shows the physical properties of three compositions after they were cured by heating them from 50° C. to 175° C. at 5° C./min. and held at 175° C. for 25 minutes in a 10 inch by 10 inch by ⅛ inch mold.

TABLE II

| Sample | III-3 | III-5 | III-6 |
|---|---|---|---|
| Tensile strength (psi) | 11,900 | 11,100 | 10,930 |
| Tensile modulus (psi) | 409,800 | 418,200 | 406,800 |
| % Elongation | 9.2 | 5.5 | 5.2 |
| Flexural strength (psi) | 18,600 | 16,800 | 17,200 |
| Flexural modulus (psi) | 404,800 | 403,600 | 418,800 |
| Tg (DMTA) | 161 | 173 | 156 |
| Tg (DSC) | 152 | 163 | 151 |
| Durometer hardness | 88 | 89 | 89 |
| 24 hour water boil | | | |
| % weight gain | 1.47 | 1.36 | 1.32 |
| % flexural str. retention | 86 | 92 | 81 |
| % flexural mod. retention | 95 | 94 | 95 |
| % hardness retention | 99 | 99 | 99 |

It is obvious that many variations can be made in the products and processes set forth above without departing from the spirit and scope of this invention.

What is claimed is:

1. A composition for curing epoxy resins which comprises about 99.6–90% by weight of a hindered aromatic diamine and about 0.4–10% by weight of a boron trifluoride/cycloaliphatic diamine accelerator complex.

2. The composition of claim 1 wherein the hindered aromatic diamine is a liquid in which the complex is dissolved.

3. The composition of claim 2 wherein the hindered aromatic diamine is diethyltoluenediamine.

4. The composition of claim 1 wherein the cycloaliphatic diamine contains a cyclohexyl ring.

5. The composition of claim 4 wherein the cycloaliphatic diamine is isophoronediamine.

6. The composition of claim 1 wherein the hindered aromatic diamine is diethyltoluenediamine and the cycloaliphatic diamine is isophoronediamine.

7. A curable composition comprising an epoxy resin and a curing agent composition which comprises about 99.6–90% by weight of a hindered aromatic diamine and about 0.4–10% by weight of a boron trifluoride/cycloaliphatic diamine accelerator complex, the amount of curing agent composition being such as to provide about 0.5–1.5 equivalents of hindered aromatic diamine per equivalent of epoxy resin.

8. The composition of claim 7 wherein the epoxy resin is a liquid.

9. The composition of claim 8 wherein the epoxy resin is a diglycidyl ether of bisphenol A.

10. The composition of claim 7 wherein the hindered aromatic diamine is a liquid in which the complex is dissolved.

11. The composition of claim 10 wherein the hindered aromatic diamine is diethyltoluenediamine.

12. The composition of claim 7 wherein the cycloaliphatic diamine contains a cyclohexyl ring.

13. The composition of claim 12 wherein the cycloaliphatic diamine is isophoronediamine.

14. The composition of claim 7 containing about 0.8–1.3 equivalents of hindered aromatic diamine per equivalent of epoxy resin.

15. The composition of claim 7 wherein the epoxy resin is a liquid diglycidyl ether of bisphenol A, the hindered aromatic diamine is diethyltoluenediamine, the cycloaliphatic diamine is isophoronediamine, and the amount of curing agent is such as to provide about 0.8–1.3 equivalents of diethyltoluenediamine per equivalent of epoxy resin.

16. A process which comprises accelerating the hindered aromatic diamine cure of an epoxy resin by conducting the cure in the presence of about 0.1–2.5 parts by weight of a boron trifluoride/cycloaliphatic diamine complex per 100 parts by weight of the epoxy resin.

17. The process of claim 16 wherein the hindered aromatic diamine is diethyltoluenediamine, the epoxy resin is a liquid diglycidyl ether of bisphenol A, the cycloaliphatic diamine is isophoronediamine, and the amount of complex is about 0.5–1.0 part per 100 parts of resin.

* * * * *